United States Patent
Jung et al.

(10) Patent No.: US 10,129,626 B1
(45) Date of Patent: Nov. 13, 2018

(54) CASE INCLUDING SPEAKER FOR OUTPUTTING SOUND USING EARPHONES

(71) Applicant: ALON INC., Seoul (KR)

(72) Inventors: Han Deok Jung, Siheung-si (KR); Jung Kyu Choi, Namyangju-si (KR)

(73) Assignee: ALON INC., Seoul (KR)

( * ) Notice: Subject to any disclaimer, the term of this patent is extended or adjusted under 35 U.S.C. 154(b) by 0 days.

(21) Appl. No.: 15/840,983

(22) Filed: Dec. 13, 2017

(30) Foreign Application Priority Data

Nov. 20, 2017 (KR) .................. 10-2017-0154983

(51) Int. Cl.
  *H04R 5/02* (2006.01)
  *H04R 1/10* (2006.01)
  *H04R 1/02* (2006.01)
  *H02J 7/00* (2006.01)

(52) U.S. Cl.
  CPC .......... *H04R 1/1016* (2013.01); *H02J 7/0044* (2013.01); *H04R 1/02* (2013.01); *H04R 1/105* (2013.01); *H04R 2420/07* (2013.01)

(58) Field of Classification Search
  CPC ...................................................... H04R 5/02
  See application file for complete search history.

(56) References Cited

U.S. PATENT DOCUMENTS

| | | | |
|---|---|---|---|
| 2015/0214404 A1* | 7/2015 | Snidow | H02S 30/20 136/245 |
| 2017/0018957 A1* | 1/2017 | Lucrecio | H02J 7/35 |
| 2017/0094399 A1* | 3/2017 | Chandramohan | A45C 13/02 |
| 2017/0164089 A1 | 6/2017 | Lee et al. | |
| 2017/0195771 A1* | 7/2017 | Hung | G06F 3/165 |
| 2017/0303028 A1* | 10/2017 | Lalvani | H04R 1/1008 |
| 2017/0325016 A1* | 11/2017 | Lee | H04R 1/1041 |
| 2017/0374184 A1* | 12/2017 | Kim | H04M 1/6066 |
| 2018/0014109 A1* | 1/2018 | Boesen | H04R 1/1041 |
| 2018/0026778 A1* | 1/2018 | Jo | H04L 7/0012 |

FOREIGN PATENT DOCUMENTS

| | | |
|---|---|---|
| KR | 20090097619 A | 9/2009 |
| KR | 101561782 B1 | 10/2015 |
| KR | 20160092643 A | 8/2016 |
| KR | 20170067050 A | 6/2017 |

OTHER PUBLICATIONS

Office Action, dated Jan. 18, 2018, in Korean Patent Application No. 10-2017-0154983.

* cited by examiner

*Primary Examiner* — Olisa Anwah
(74) *Attorney, Agent, or Firm* — Klarquist Sparkman, LLP

(57) ABSTRACT

Provided is a case including a speaker for outputting sound using earphones, the case including a master earphone for receiving an audio signal from an external device through Bluetooth communication, a slave earphone separate from the master earphone to receive the audio signal from the master earphone through Bluetooth communication, and the case including a pair of coupling parts capable of individually accommodating the master and slave earphones, wherein the case further includes a charging unit for supplying power to the master and slave earphones, and the speaker for outputting the audio signal received from at least one of the master and slave earphones.

9 Claims, 5 Drawing Sheets

CASE INCLUDING SPEAKER FOR OUTPUTTING SOUND USING EARPHONES

CROSS-REFERENCE TO RELATED APPLICATION

This application claims the benefit of Korean Patent Application No. 10-2017-0154983, filed on Nov. 20, 2017, in the Korean Intellectual Property Office, the disclosure of which is incorporated herein in its entirety by reference.

BACKGROUND

1. Field

One or more embodiments relate to a case including a speaker for outputting sound using earphones, and more particularly, to a case capable of outputting sound using wireless Bluetooth earphones and of providing power to charge the wireless earphones.

2. Description of the Related Art

Since portable electronic devices such as MP3 players and smartphones are developed, a variety of portable output devices capable of outputting sound generated by the electronic devices, to individual users are developed and used.

Bluetooth refers to a short-range wireless communication standard. A Bluetooth module may be mounted in a portable mobile communication device and communicate with a Bluetooth headset in a wireless manner, thereby enabling voice calls.

Currently, a portable storing/charging device capable of storing data or charging the Bluetooth headset irrespective of the location of a user is mounted in the Bluetooth headset. In addition, earphones are connected to the headset in a wired manner.

However, the wired connection of the earphones causes inconvenience in using the Bluetooth headset. Therefore, nowadays, research is being continuously conducted on how to improve the Bluetooth headset to increase convenience of use.

SUMMARY

One or more embodiments include a case including a speaker for outputting sound using a pair of earphones connected to each other in a wireless Bluetooth manner, the case being capable of receiving an audio signal from an external device and outputting the audio signal through the speaker included in a charger.

Additional aspects will be set forth in part in the description which follows and, in part, will be apparent from the description, or may be learned by practice of the presented embodiments.

According to one or more embodiments, a case including a speaker for outputting sound using earphones includes a master earphone for receiving an audio signal from an external device through Bluetooth communication, a slave earphone separate from the master earphone to receive the audio signal from the master earphone through Bluetooth communication, and the case including a pair of coupling parts capable of individually accommodating the master and slave earphones, wherein the case further includes a charging unit for supplying power to the master and slave earphones, and the speaker for outputting the audio signal received from at least one of the master and slave earphones.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
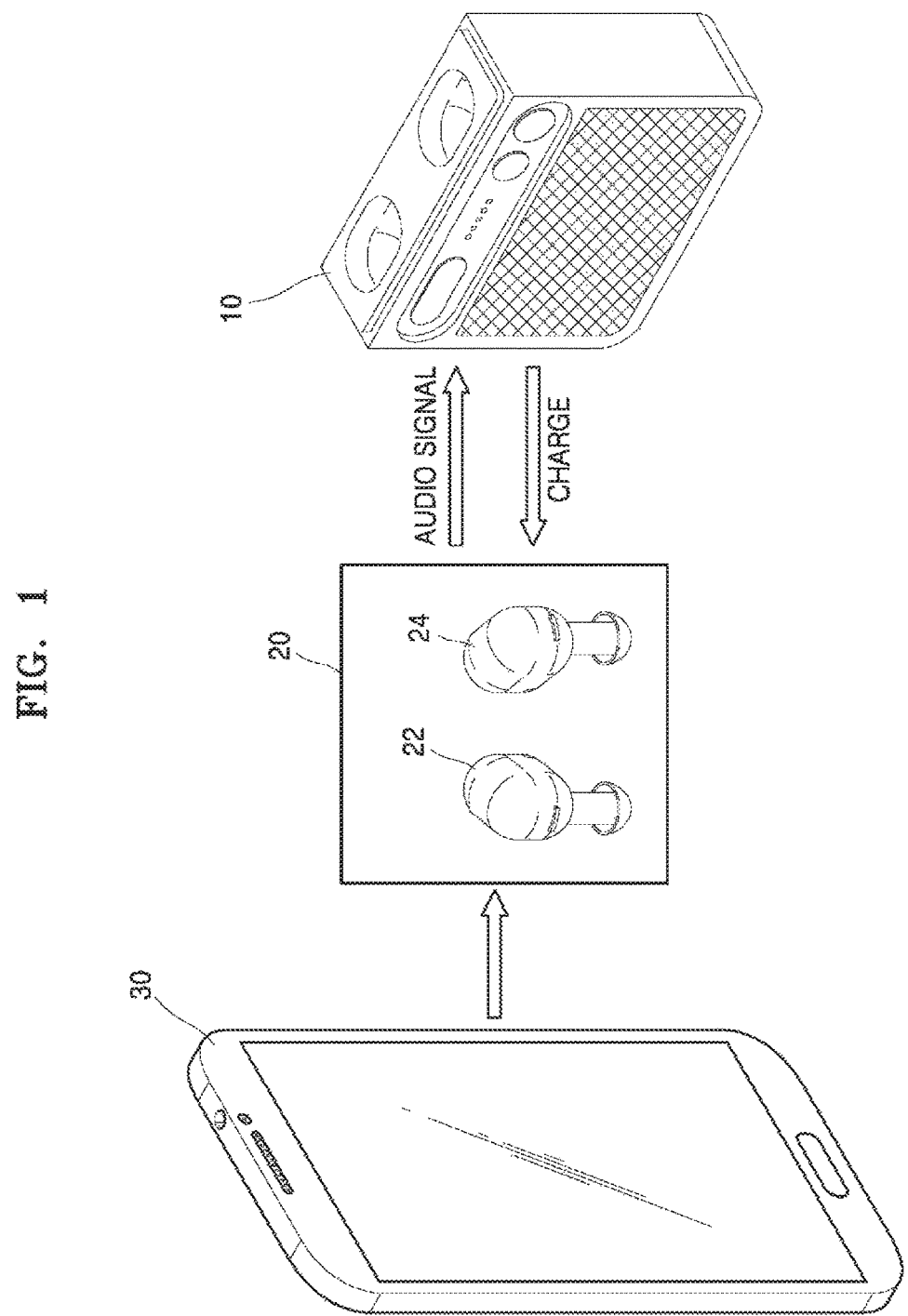
FIG. 1 is a diagram for describing an operation method of a case including a speaker for outputting sound using earphones, according to an embodiment.

Reference will now be made in detail to embodiments, examples of which are illustrated in the accompanying drawings. However, the present embodiments may have different forms and should not be construed as being limited to the descriptions set forth herein. In the drawings, for clarity of explanation, parts or elements that are not related to the embodiments are omitted and like reference numerals refer to like elements. Expressions such as "at least one of," when preceding a list of elements, modify the entire list of elements and do not modify the individual elements of the list.

It will be understood that when an element is referred to as being "connected to" another element, it may be "directly connected to" the other element or may be "electrically connected to" the other element via an intervening element. It will be further understood that the terms "comprises", "comprising", "includes" and/or "including", when used herein, specify the presence of stated elements, but do not preclude the presence or addition of one or more other elements unless context dictates otherwise.

Hereinafter, the embodiments will be described in detail with reference to the attached drawings.

FIG. 1 is a diagram for describing an operation method of a case 10 including a speaker for outputting sound using earphones 20, according to an embodiment.

According to an embodiment, a pair of earphones 20 which communicate with each other in a wireless manner may be provided. The pair of earphones 20 may include a master earphone 22 and a slave earphone 24 which are physically separate from each other.

According to an embodiment, the master earphone 22 may be designed to be inserted into the left ear or the right ear of a user. According to an embodiment, the master earphone 22 may receive an audio signal from an external device 30 through Bluetooth communication.

According to an embodiment, the slave earphone 24 may be designed to be inserted into the left ear or the right ear of a user. According to an embodiment, the slave earphone 24 may receive the audio signal from the master earphone 22 through Bluetooth communication.

According to an embodiment, the case 10 includes holes capable of accommodating both of the pair of earphones 20.

According to an embodiment, the case 10 includes holes to which the master and slave earphones 22 and 24 are couplable.

According to an embodiment, the external device 30 may include all types of devices capable of transmitting the audio signal. For example, the external device 30 may be a smartphone, tablet PC, PC, smart TV, mobile phone, personal digital assistant (PDA), laptop, media player, micro server, global positioning system (GPS) device, ebook reader, digital broadcast receiver, navigation system, kiosk, MP3 player, digital camera, home appliance, or another mobile or stationary computing device, but is not limited thereto. Alternatively, the external device 30 may be a wearable device (e.g., a watch, glasses, hairband, or ring) having a communication function and data processing function, but is not limited thereto.

Figure 2:
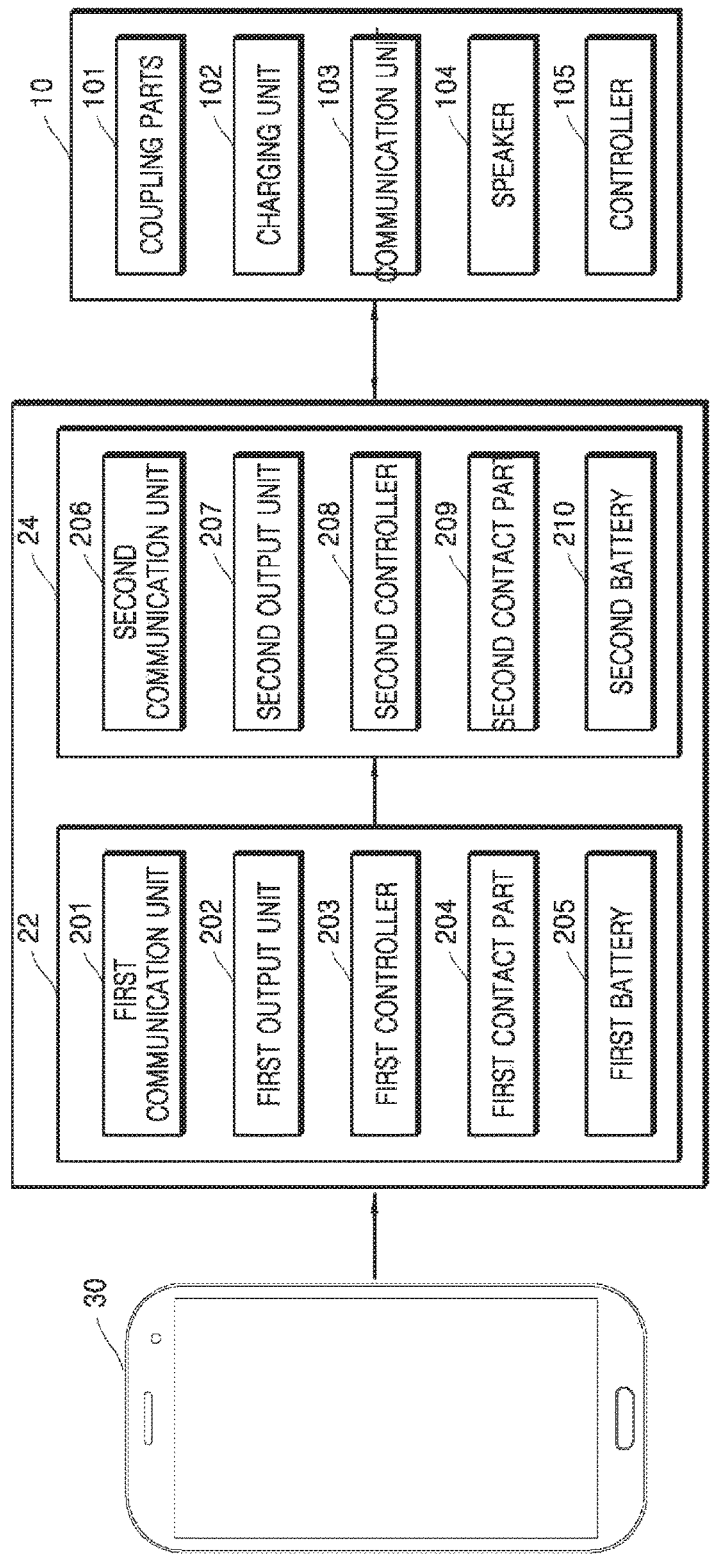
FIG. 2 is a diagram for describing the configuration of the case according to an embodiment.

FIG. 2 is a diagram for describing the configuration of the case 10 according to an embodiment.

According to an embodiment, the master earphone 22 may include a first communication unit 201, a first output unit 202, a first controller 203, a first contact part 204, and a first battery 205.

According to an embodiment, the first communication unit 201 may transmit or receive an audio signal to or from the external device 30 and the slave earphone 24 through wireless communication.

A small electronic device having a Bluetooth or Wi-Fi function may be coupled to the first communication unit 201. The first communication unit 201 may receive an input signal directly or via an external communication device to control operation of the master earphone 22.

When the input signal received from the external device 30 is a signal for controlling a sound level of the first output unit 202, the first communication unit 201 may transmit the signal to the first controller 203 to adjust the sound level of the first output unit 202.

According to an embodiment, the first output unit 202 may output the audio signal received from the external device 30. According to an embodiment, when inserted into an ear of a user, the first output unit 202 may output the audio signal into the ear of the user.

According to an embodiment, the first controller 203 may convert the audio signal received from the external device 30, into an audio signal capable of outputting from the slave earphone 24. In addition, the first controller 203 may control the audio signal to be transmitted to the slave earphone 24 and the case 10.

According to an embodiment, the first contact part 204 is a part contacting the case 10. The first contact part 204 may be made of metal. The first contact part 204 servers as a path for receiving power from the case 10.

According to an embodiment, the first battery 205 may provide power to operate the master earphone 22. The first battery 205 may be charged by receiving power through the first contact part 204 from the case 10.

According to an embodiment, the slave earphone 24 may include a second communication unit 206, a second output unit 207, a second controller 208, a second contact part 209, and a second battery 210.

According to an embodiment, the second communication unit 206 may transmit or receive the audio signal to or from the master earphone 22 through wireless communication.

According to an embodiment, each of the first communication unit 201 and the second communication unit 206 may include a short-range wireless communication unit. The short-range wireless communication unit may include a Bluetooth communication unit, a Bluetooth low energy (BLE) communication unit, a near field communication unit, a wireless local area network (WLAN) (e.g., Wi-Fi) communication unit, a ZigBee communication unit, an infrared data association (IrDA) communication unit, a Wi-Fi direct (WFD) communication unit, an ultra wideband (UWB) communication unit, an Ant+ communication unit, etc., but is not limited thereto.

According to an embodiment, the second controller 208 may control the audio signal received from the master earphone 22, to be output through the second output unit 207.

According to an embodiment, the configurations and functions of the second contact part 209 and the second battery 210 are the same as those of the first contact part 204 and the first battery 205 of the master earphone 22.

According to an embodiment, the case 10 may include coupling parts 101, a charging unit 102, a communication unit 103, a speaker 104, and a controller 105.

According to an embodiment, the coupling parts 101 may include a pair of holes provided outside the case 10 in such a manner that the master and slave earphones 22 and 24 are couplable thereto. According to an embodiment, the coupling parts 101 may further include retainers to prevent undesired detachment of the coupled master and slave earphones 22 and 24.

According to an embodiment, each retainer may include a spring and, when the master or slave earphone 22 or 24 is coupled, the spring may support the coupled master or slave earphone 22 or 24. According to an embodiment, when the master or slave earphone 22 or 24 is coupled, the retainer may be inserted into the case 10.

According to an embodiment, the charging unit 102 may include a power supply unit for receiving power from outside. The power supply unit may be charged in connection with an external power source.

According to an embodiment, the charging unit 102 may include a detection unit for generating a detection signal by detecting whether at least one of the master and slave earphones 22 and 24 is coupled.

According to an embodiment, the charging unit 102 may include a charging circuit unit for starting to charge at least one of the master and slave earphones 22 and 24 using the power of the power supply unit when the detection signal is received from the detection unit.

The charging circuit unit may include a switching power circuit for generating switching power, an electricity transmission circuit for generating an induced voltage using the switching power, a noise cancellation circuit for removing high-frequency noise generated when the induced voltage is generated, and a power transmission circuit for charging the master and slave earphones 22 and 24 using the induced voltage.

According to an embodiment, the charging unit 102 may include a battery indicator for indicating a battery level of the master or slave earphone 22 or 24.

According to an embodiment, the communication unit 103 may communicate with the master or slave earphone 22 or 24. According to an embodiment, the communication unit 103 may include a wired communication unit or a wireless communication unit. According to an embodiment, the communication unit 103 may receive the audio signal from the master or slave earphone 22 or 24 coupled to the coupling part 101.

According to an embodiment, the speaker 104 may output the audio signal received from the master or slave earphone 22 or 24 coupled to the coupling part 101.

According to an embodiment, the speaker 104 may include a decoder for performing a decoding operation to divide the audio signal received from one of the master and slave earphones 22 and 24, into a treble range in stereo and a bass range.

According to an embodiment, the speaker 104 may include an amplifier for amplifying the audio signal divided into the treble and bass ranges, and a first stereo speaker for outputting sound of a first treble range of the amplified audio signal.

According to an embodiment, the speaker 104 may include a second stereo speaker spaced apart from the first stereo speaker by a certain distance to output sound of a second treble range of the amplified audio signal.

According to an embodiment, the speaker 104 may include a woofer speaker mounted on a main body of the case 10 to output sound of the bass range of the amplified audio signal.

According to an embodiment, the controller 105 may generate a detection signal by detecting whether at least one of the master and slave earphones 22 and 24 is coupled. According to an embodiment, the controller 105 may generate a signal for starting wireless pairing between the master earphone 22 and the external device 30 in response to the detection signal.

Figure 3:
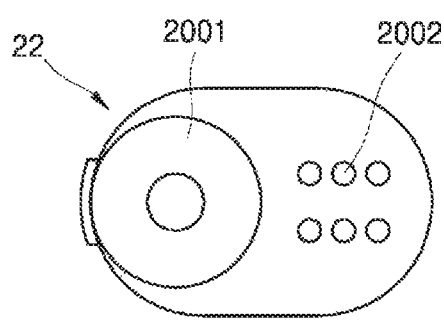
FIG. 3 is a front view of the earphone according to an embodiment.

FIG. 3 is a front view of an earphone according to an embodiment.

Although the master earphone 22 is illustrated in FIG. 3, the earphone according to an embodiment may also be the slave earphone 24. According to an embodiment, when the master earphone 22 has a shape to be inserted into the right ear of a user, the slave earphone 24 may have a shape to be inserted into the user.

According to an embodiment, the master earphone 22 may be provided in a shape to be inserted into an ear of the user. According to an embodiment, the first output unit 202 may be embedded in a projection 2001 to be inserted into the ear of the user.

According to an embodiment, the master earphone 22 may include a communication terminal 2002 communicable with the external device 30, the slave earphone 24, and the case 10.

Figure 4:
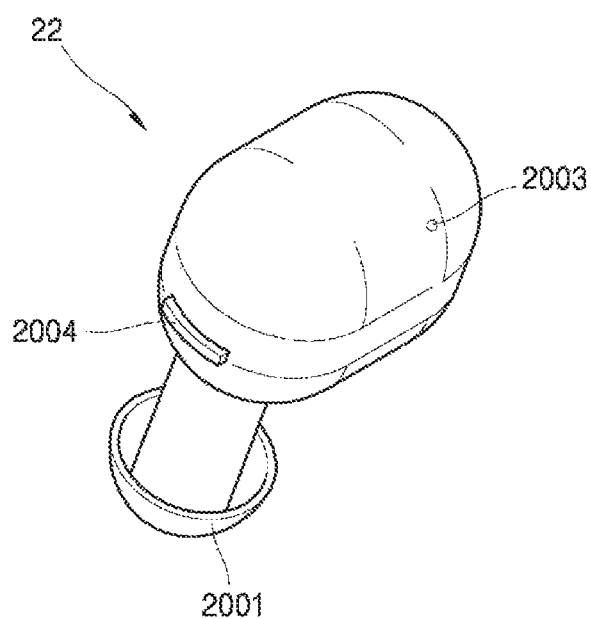
FIG. 4 is a rear perspective view of the earphone according to an embodiment.

FIG. 4 is a rear perspective view of the earphone according to an embodiment.

According to an embodiment, the master earphone 22 may include a microphone 2003 for receiving a voice signal from outside. The master earphone 22 may transmit the received voice signal to the external device 30 or the case 10.

According to an embodiment, the master earphone 22 may include a manipulation button 2004. A user may control may control a sound level of an audio signal output from the master earphone 22 and an on or off state of the master earphone 22 by pressing the manipulation button 2004. For example, the sound level may be controlled when the user moves the manipulation button 2004 upward or downward, and the master earphone 22 may be turned on or off when the user presses the manipulation button 2004 for a certain time or longer.

Figure 5:
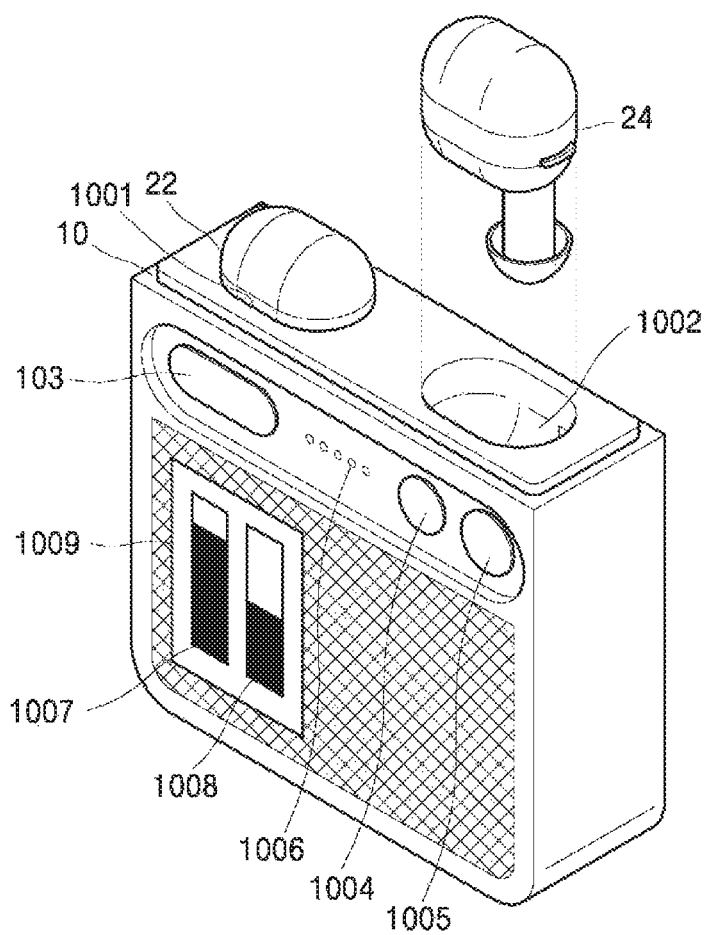
FIG. 5 is a perspective view of the case according to an embodiment.

FIG. 5 is a perspective view of the case 10 according to an embodiment.

The case 10 according to an embodiment may include a first coupling part 1001 used to electrically couple the master earphone 22 thereto and including a magnet for applying a force for attracting the master earphone 22.

In addition, the case 10 according to an embodiment may include a second coupling part 1002 used to electrically couple the slave earphone 24 thereto and including a magnet for applying a force for attracting the slave earphone 24.

According to an embodiment, when the master earphone 22 approaches the first coupling part 1001, the magnet of the first coupling part 1001 may attract and be coupled to a magnet of the master earphone 22. Therefore, the master and slave earphones 22 and 24 may be stably coupled to the case 10.

According to an embodiment, the case 10 may include a power button 1003. When the power button 1003 of the case 10 is selected, an on or off state of the speaker 1006 or a charging unit may be controlled. For example, the on or off state of the speaker 1006 or the charging unit may be controlled based on a time for which or a force by which the power button 1003 is pressed.

According to an embodiment, the case 10 may include a display unit 1009. The display unit 1009 may include first and second battery indicators 1007 and 1008 indicating battery levels of the master and slave earphones 22 and 24. For example, the case 10 may indicate the battery levels of the master and slave earphones 22 and 24 connected to the case 10. When the master earphone 22 is coupled to the first coupling part 1001 of the case 10, the first battery indicator 1007 may indicate the battery level of the master earphone 22. In addition, when the slave earphone 24 is coupled to the second coupling part 1002 of the case 10, the second battery indicator 1008 may indicate the battery level of the slave earphone 24.

According to an embodiment, the speaker 1006 may output an audio signal received through the master or slave earphone 22 or 24. According to an embodiment, the level of sound output through the speaker 1006 may be adjusted by sound level adjusters 1004 and 1005.

According to an embodiment, the case 10 may include a self-generating device or an auxiliary generating device including at least one of a photovoltaic generator and a kinetic generator. Therefore, even when the case 10 is not connected to an external power source, the case 10 may be driven for a certain time using the self-generating device or the auxiliary generating device. For example, the case 10 may charge the master or slave earphone 22 or 24 or drive the speaker 1006 using the self-generating device or the auxiliary generating device.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the embodiments, reference has been made to the embodiments illustrated in the drawings, and specific terminology has been used to describe these embodiments. However, no limitation of the scope of the embodiments is intended by this specific terminology, and the embodiments should be construed to encompass all elements that would normally occur to one of ordinary skill in the art.

The particular implementations shown and described herein are illustrative examples of the embodiments and are not intended to otherwise limit the scope of the embodiments in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no element is essential for implementation of the embodiments unless the element is specifically described as "essential" or "critical".

What is claimed is:

1. A case comprising a speaker for outputting sound using earphones, the case comprising:
   a master earphone for receiving an audio signal from an external device through Bluetooth communication;
   a slave earphone separate from the master earphone to receive the audio signal from the master earphone through Bluetooth communication; and
   the case comprising a pair of coupling parts capable of individually accommodating the master and slave earphones,
   wherein the case further comprises:
   a charging unit for supplying power to the master and slave earphones; and
   the speaker for outputting the audio signal received from at least one of the master and slave earphones,
   wherein the speaker comprises:
   a decoder for performing a decoding operation to divide the audio signal received from one of the master and slave earphones, into a treble range in stereo and a bass range;
   an amplifier for amplifying the audio signal divided into the treble and bass ranges;
   a first stereo speaker for outputting sound of a first treble range of the amplified audio signal;
   a second stereo speaker spaced apart from the first stereo speaker by a certain distance to output sound of a second treble range of the amplified audio signal; and
   a woofer speaker mounted on a main body of the case to output sound of the bass range of the amplified audio signal.

2. The case of claim 1, wherein the case further comprises a controller for generating a detection signal by detecting whether at least one of the master and slave earphones is coupled, and generating a signal for starting wireless pairing between the master earphone and the external device in response to the detection signal.

3. The case of claim 1, wherein the case comprises:
   a first coupling part used to electrically couple the master earphone thereto and comprising a magnet for applying a force for attracting the master earphone; and
   a second coupling part used to electrically couple the slave earphone thereto and comprising a magnet for applying a force for attracting the slave earphone.

4. The case of claim 1, wherein the charging unit comprises:
   a power supply unit for receiving power from outside;
   a detection unit for generating a detection signal by detecting whether at least one of the master and slave earphones is coupled;
   a charging circuit unit for starting to charge at least one of the master and slave earphones using the power of the power supply unit when the detection signal is received from the detection unit; and
   battery indicators for indicating battery levels of the master and slave earphones.

5. The case of claim 4, wherein the charging circuit unit comprises:
   a switching power circuit for generating switching power;
   an electricity transmission circuit for generating an induced voltage using the switching power;
   a noise cancellation circuit for removing high-frequency noise generated when the induced voltage is generated; and
   a power transmission circuit for charging the master and slave earphones using the induced voltage.

6. The case of claim 1, wherein the master earphone comprises:
   a first communication unit for transmitting or receiving the audio signal to or from the external device and the slave earphone through wireless communication;
   a first output unit for outputting the audio signal received from the external device;
   a first contact part contacting the case to transmit the audio signal to the case through wired communication and to receive power from the case;
   a first battery charged with the power received through the first contact part; and
   a first controller for converting the audio signal received from the external device, into an audio signal capable of outputting from a second output unit, and controlling the audio signal to be transmitted to the slave earphone and the case.

7. The case of claim 1, wherein the slave earphone comprises:
   a second communication unit for transmitting or receiving the audio signal to or from the master earphone through wireless communication;
   a second output unit for outputting the audio signal received from the master earphone;
   a second contact part contacting the case to transmit the audio signal to the case through wired communication and to receive power from the case;
   a second battery charged with the power received through the second contact part; and
   a second controller for converting the audio signal received from the master earphone, into an audio signal capable of outputting from the second output unit, and controlling the audio signal to be transmitted to the case.

8. The case of claim 1, wherein the case comprises a self-generating device or an auxiliary generating device comprising at least one of a photovoltaic generator and a kinetic generator.

9. A case comprising a speaker for outputting sound using earphones, the case comprising:
   a master earphone for receiving an audio signal from an external device through Bluetooth communication;
   a slave earphone separate from the master earphone to receive the audio signal from the master earphone through Bluetooth communication;
   a pair of coupling parts capable of individually accommodating the master and slave earphones;
   a speaker for outputting the audio signal received from at least one of the master and slave earphones; and
   a charging unit for supplying power to the master and slave earphones,
   wherein the charging unit comprises:
   a power supply unit for receiving power from outside;
   a detection unit for generating a detection signal by detecting whether at least one of the master and slave earphones is coupled;
   battery indicators for indicating battery levels of the master and slave earphones; and
   a charging circuit unit for starting to charge at least one of the master and slave earphones using the power of the power supply unit when the detection signal is received from the detection unit, wherein the charging circuit unit comprises:
a switching power circuit for generating switching power;
an electricity transmission circuit for generating an induced voltage using the switching power;
a noise cancellation circuit for removing high-frequency noise generated when the induced voltage is generated; and
a power transmission circuit for charging the master and slave earphones using the induced voltage.

* * * * *